United States Patent [19]
Ito et al.

[11] Patent Number: 5,713,244
[45] Date of Patent: Feb. 3, 1998

[54] ROBOT

[75] Inventors: Hiroyasu Ito; Minoru Kikuya; Yoshiyuki Sakaguchi, all of Narashino, Japan

[73] Assignee: Seiko Seiki Kabushiki Kaisha, Japan

[21] Appl. No.: 602,972

[22] Filed: Feb. 16, 1996

[30] Foreign Application Priority Data

Feb. 20, 1995 [JP] Japan ................................ 7-055158

[51] Int. Cl.[6] .................................................. F16H 25/20
[52] U.S. Cl. ..................... 74/490.09; 74/89.15; 108/143; 384/15
[58] Field of Search ..................... 74/89.15, 424.8 R, 74/490.09; 384/15; 108/143

[56] References Cited

U.S. PATENT DOCUMENTS

| | | |
|---|---|---|
| 4,955,244 | 9/1990 | Katahira .............................. 384/15 X |
| 5,228,353 | 7/1993 | Katahira et al. .......................... 74/89.15 |
| 5,292,211 | 3/1994 | Takai ................................ 74/490.09 X |
| 5,499,547 | 3/1996 | Nagai et al. ............................ 74/89.15 |

FOREIGN PATENT DOCUMENTS 2-106282  4/1990  Japan ..................... 74/89.15

*Primary Examiner*—Allan D. Herrmann
*Attorney, Agent, or Firm*—Adams & Wilks

[57] ABSTRACT

An orthogonal coordinate type robot comprises a slider and a support frame supporting the slider for movement within a predetermined range along an axis. The support frame has an inner wall surface, at least one hollow portion, and a connecting hole for communicating the hollow portion with the inner wall surface. A suction device evacuates air from the hollow portion of the support frame.

18 Claims, 4 Drawing Sheets

5,713,244

ROBOT

BACKGROUND OF THE INVENTION

This invention relates to a robot, and particularly to an orthogonal coordinates type industrial robot which carries out assembly of parts and the like.

Recently, development of robots used in clean rooms has been carried out actively. With robots used in clean rooms, because there is a danger of dust production from driving parts impairing the cleanliness factor, dust production countermeasures are a major technological issue. In particular, with an orthogonal coordinates type robot which carries out various tasks by means of driving parts moving linearly in two mutually orthogonal directions, because the robot has a large opening matching the stroke length of the linear movement, dust and the like inside the robot can easily get outside and various dust production countermeasures have been devised. For example, as well as covering the driving parts with a cover, the inside of the robot has been sucked and brought to a negative pressure by means of a vacuum pump or a blower or the like. With inside suction, because there ceases to be any flow of gas from inside the robot to the outside there of, dust produced inside the robot does not get outside and impairment of the cleanliness factor due to dust production can be prevented.

As methods of suction, there are methods wherein suction is carried out locally by extending suction piping to parts producing dust and methods wherein the whole of the inside of the robot is sucked by a powerful blower or the like.

However, in the case of local suction, there is the problem that the robot becomes large by an amount corresponding to the piping. With methods wherein the whole of the inside of the robot is sucked, because a powerful blower with excellent sucking power is necessary the robot similarly becomes large and also becomes expensive.

SUMMARY OF THE INVENTION

Accordingly, it is an object of this invention to provide a robot with which it is possible to prevent the production of dust effectively without the robot becoming large and expensive.

In order to attain the foregoing object, according to the present invention, there is provided an orthogonal coordinates type robot having a plurality of sliders which respectively move in two mutually orthogonal directions with a frame housing part of the slider, a hollow part provided inside this frame, a connecting hole connecting this hollow part and an inner side space of the frame, and sucking means for sucking the hollow part.

In such an orthogonal coordinates type robot, the sucking means sucks the hollow part of the frame. As a result, gas inside the inner side space of the frame is sucked through the connecting hole together with produced dust and the like.

To attain the above-noted and other objects, according to a first aspect of the present invention, there is provided an orthogonal coordinates type robot having a plurality of sliders which respectively move in two mutually orthogonal directions with a frame housing part of the slider, a hollow part provided inside this frame, a connecting hole connecting this hollow part and an inner side space of the frame, and sucking means for sucking the hollow part.

According to a second aspect of the invention, there is provided an orthogonal coordinates type robot, wherein the frame is provided with a guide rail which guides the slider, and an opening of the connecting hole on the inner side space of the frame is positioned near the guide rail.

According to a third aspect of the invention, there is provided an orthogonal coordinates type robot with a sensor groove formed in an inner wall of the frame along the direction of movement of the slider, a sensor dog groove formed in the inner wall of the frame in parallel with the sensor groove, a sensor dog fixing member mounted in any position in this sensor dog groove, a sensor dog fixed by this sensor dog fixing member in a position where it covers part of the sensor groove, and a position detecting sensor mounted on the slider in a position where it faces the sensor groove for detecting the presence and absence of the sensor dog.

According to a fourth aspect of the invention, there is provided an orthogonal coordinates type robot with a stopper groove formed in an inner wall of the frame along the direction of movement of the slider, a stopper fixing member mounted in any position in this stopper groove, and a stopper member fixed by this stopper fixing member inside the movement range of the slider.

According to the first aspect, the sucking means sucks the hollow part of the frame. As a result, gas inside the inner side space of the frame is sucked through the connecting hole together with produced dust and the like.

According to the second aspect, the slider moves while being guided by the guide rail. Dust and the like produced by contacting parts of the slider and the guide rail is sucked into the connecting hole having an opening near the guide rail.

According to the third aspect, the position detecting sensor moves together with the slider and detects the presence and absence of the sensor dog in the course of this movement.

According to the fourth aspect, the slider abuts with the stopper member and thereby has its movement range limited.

DETAILED DESCRIPTION OF THE PREFERRED EMBODIMENTS

An embodiment of a robot of the invention will now be described in detail with reference to FIG. 1 through FIG. 4.

Figure 1:
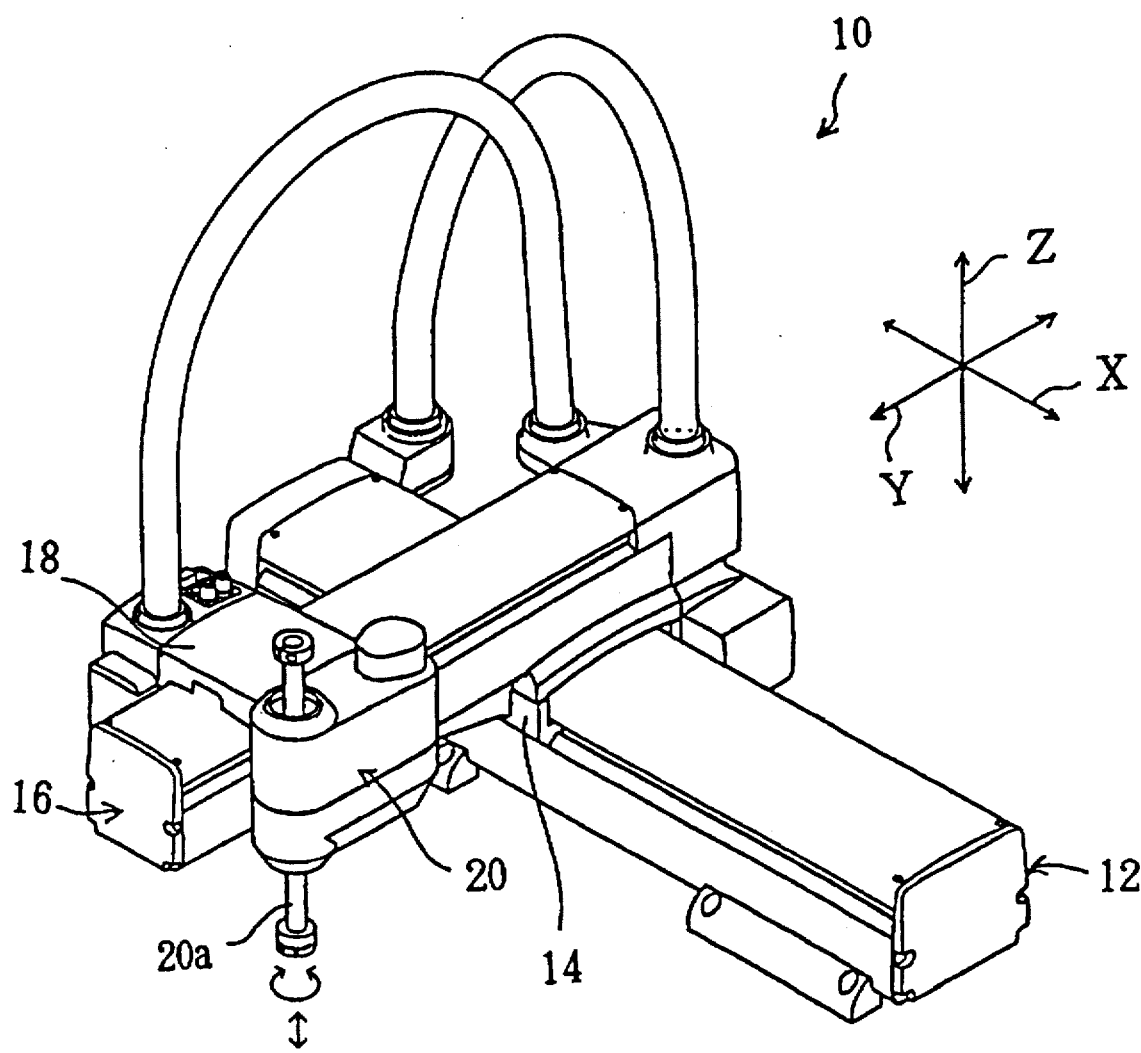
FIG. 1 is a perspective view showing the external appearance of a robot according to an embodiment of the invention.

FIG. 1 shows the external appearance of a robot according to this embodiment. In the figure, the mutually orthogonal X axis and Y axis are taken as the horizontal direction and the Z axis is taken as the vertical direction.

The robot 10 of this embodiment comprises a first slider support part 12 having an approximate rectangular parallelepiped shape, a first slider 14 which moves with respect to this first slider support part 12 in the X axis direction, a second slider support part 16 having an approximate rectangular parallelepiped shape fixed to this first slider 14, a second slider 18 which moves with respect to this second slider support part 16 in the Y axis direction, and a task unit 20 mounted on the second slider 18.

In this embodiment, the task unit 20 is movable in the XY plane by movement of the first slider 14 and the second slider 18 etc. Also, the task unit 20 has a task pin 20a which is moved up and down and rotated by motors not shown in the drawings, a prescribed tool is attached to this task pin 20a, and by the sliders 14 and 18 etc being driven the task unit 20 performs various tasks such as parts assembly.

Figure 2:
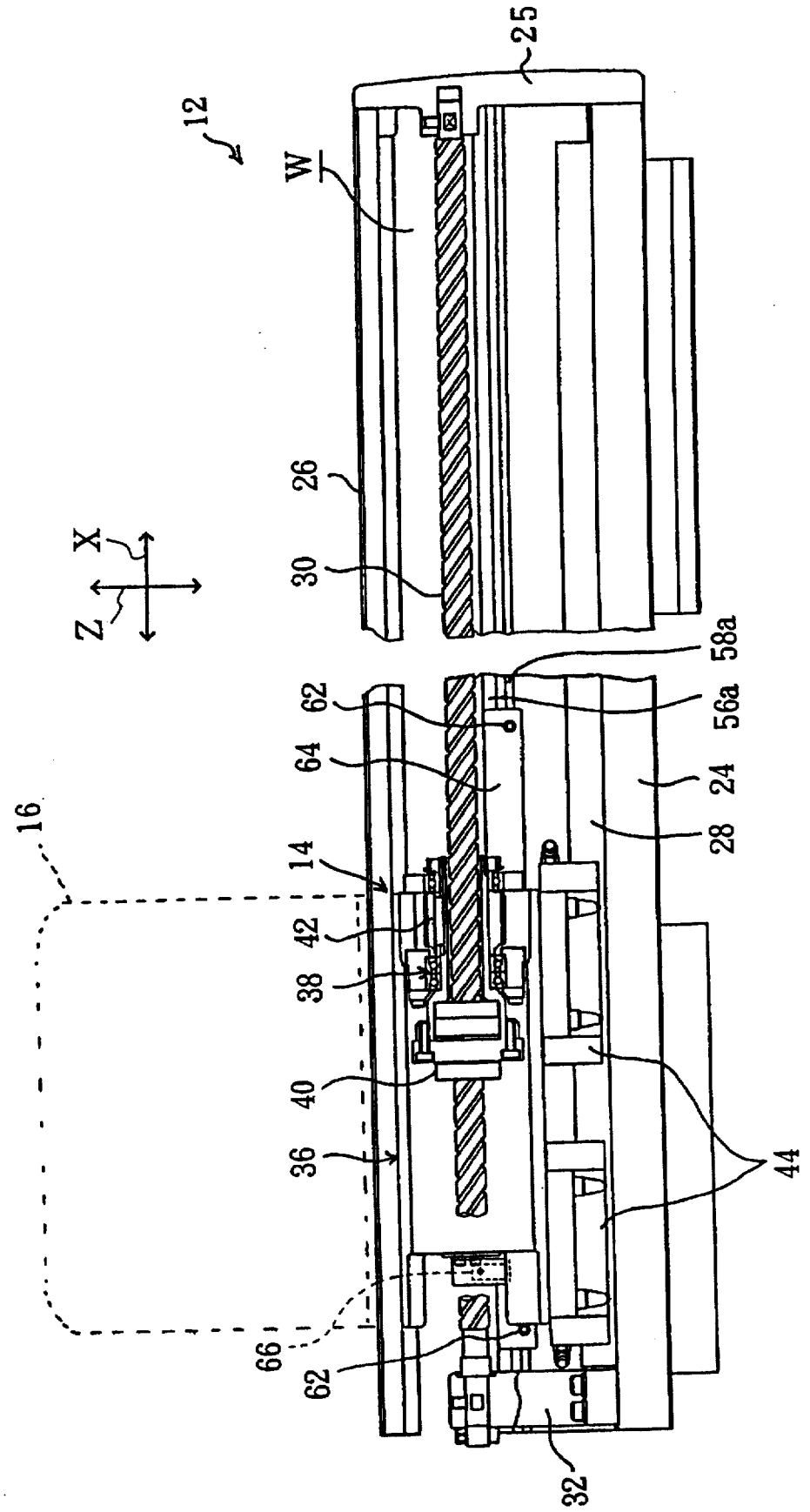
FIG. 2 is a side sectional view of the same robot.
Figure 3:
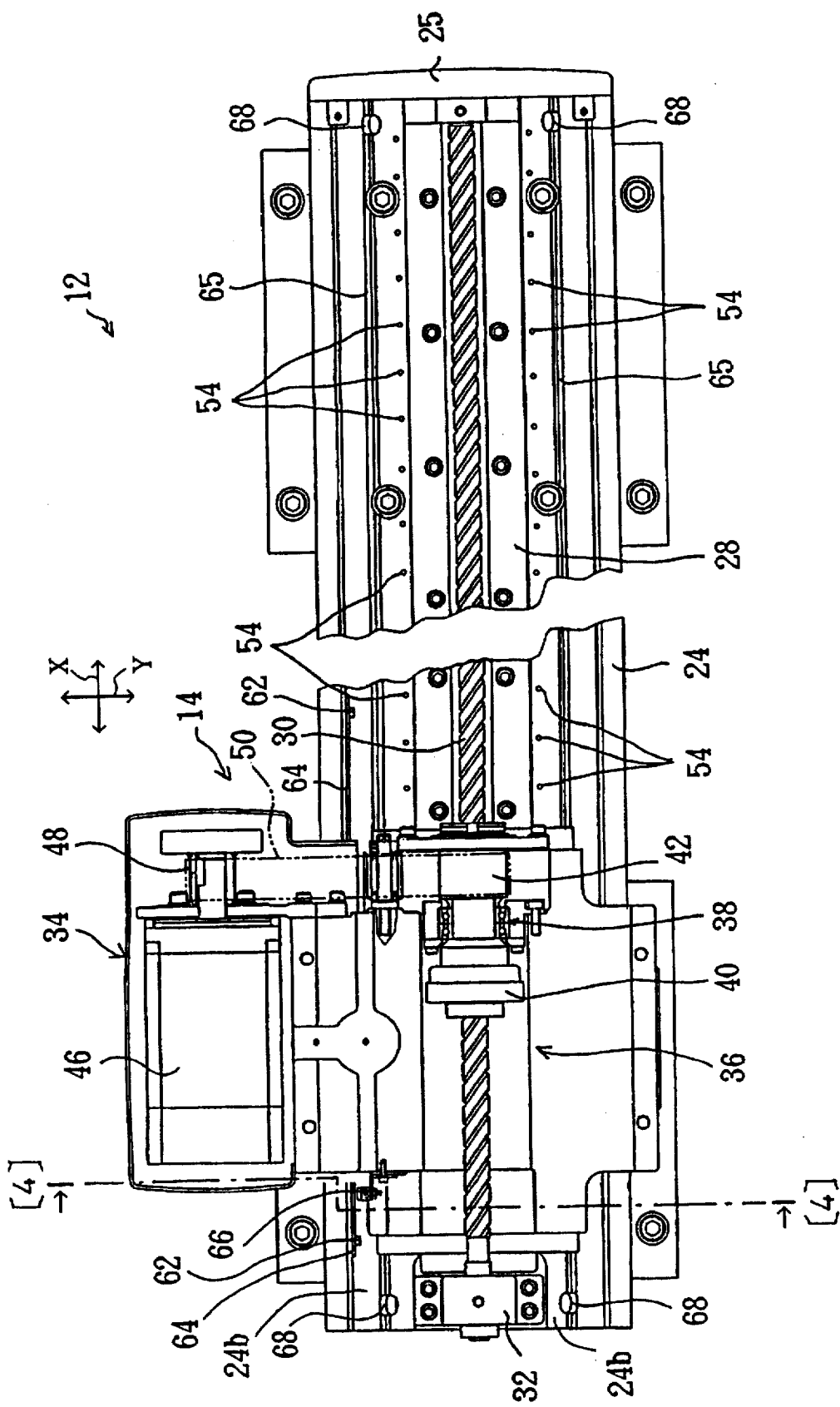
FIG. 3 is a plan sectional view of the same robot.

FIG. 2 and FIG. 3 show the internal construction of the first slider support part 12; FIG. 2 shows a side sectional view and FIG. 3 shows a plan sectional view.

As shown in FIG. 2 and FIG. 3, the first slider support part 12 has a support frame 24 constituting the bottom and sides thereof. An end cover 25 is attached to the right hand end in FIG. 2 and FIG. 3 of the support frame 24, and an upper surface cover 26 constituting the upper surface of the first slider support part 12 is disposed on the upper part of the support frame 24. A fixed gap is provided between the upper surface cover 26 and the support frame 24. A guide rail 28 is mounted along the X axis direction on the inner-side bottom surface of the support frame 24.

In this embodiment, a screw shaft 30 of a ball screw is disposed in the X axis direction inside the first slider support part 12; the left end in FIG. 2 and FIG. 3 of the screw shaft 30 is fixed in a fixing member 32 mounted on the bottom of the support frame 24 and the right end is fixed in the end cover 25.

The first slider 14 passes through the inside of the first slider support part 12 in the Y axis direction as shown in FIG. 3 by way of a window W formed by the gap between the support frame 24 and the upper surface cover 26, and mainly comprises a motor part 34 mounted outside the first slider support part 12 and a thrust mechanism 36 mounted inside the first slider support part 12.

The thrust mechanism 36 has a ball screw nut 40 rotatably supported by a bearing 38. The ball screw nut 40 by rotating moves in the axial direction (the X axis direction) with respect to the screw shaft 30, and a following pulley 42 is mounted on this ball screw nut 40. Also, as shown in FIG. 2, a guide part 44 which receives guidance from the guide rail 28 is mounted on the lower end part of the thrust mechanism 36.

On the other hand, the motor part 34 has a motor proper 46 and a driving pulley 48 mounted on an output shaft of this motor proper 46, and a timing belt 50 is strung between the driving pulley 48 and the following pulley 42 of the thrust mechanism 36.

Therefore, by the driving force of the motor proper 46 being transmitted to the following pulley 42 via the driving pulley 48 and the timing belt 50 the ball screw nut 40 is rotated and the first slider 14 is moved in the X axis direction. Driving of this motor proper 46 is controlled by a control device not shown in the drawings, and positional control of the first slider 14 is carried out by this driving control.

In FIG. 2, although the contour only is shown with a dotted line, a second slider support part 16 provided with a second slider 18 and a task pin 20a etc is fixed on the first slider 14 and moves integrally with the first slider 14 in the X axis direction.

Figure 4:
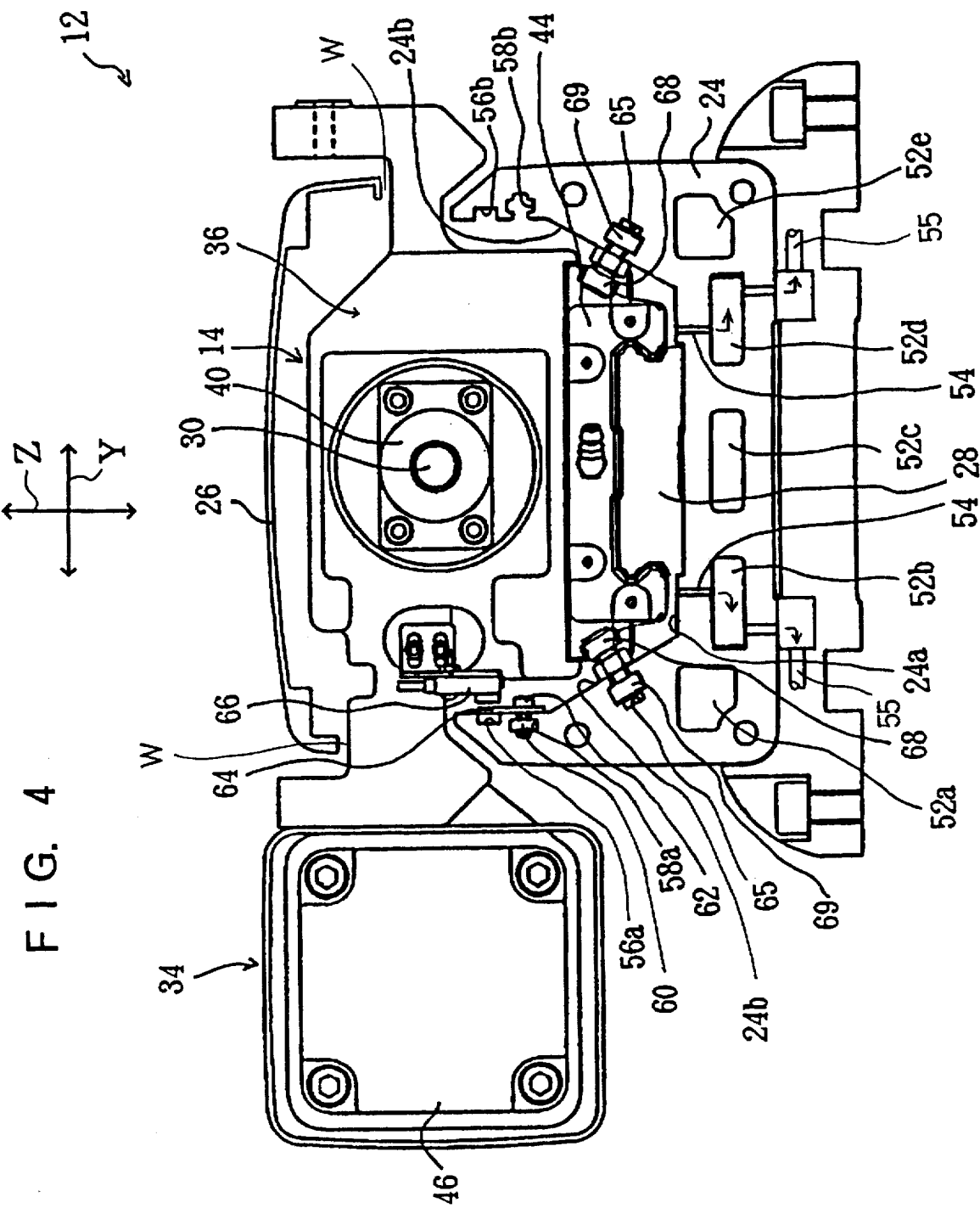
FIG. 4 is a view showing a cross-section on the line 4—4 in FIG. 3.

FIG. 4 shows a section on the line A—A in FIG. 3.

As shown in this figure, in this embodiment, hollow parts 52a, 52b, 52c, 52d, 52e are formed over the whole length of the support frame 24 for reducing the overall weight of the slider support part 12 after.

Also, a plurality of air suction holes 54 having one end open at the inner side bottom surface 24a of the support frame 24 and the other end open at the hollow parts 52b, 52d are formed in the support frame 24, and by these the inner side space of the support frame 24 and the hollow parts 52b, 52d are connected. The air suction holes 54, as shown in FIG. 3, are formed along the length direction of the guide rail 28 on both sides thereof. As shown in FIG. 4 hollow parts 52b, 52d are sucked by sucking means 55, such as a vacuum pump.

Also, in this embodiment, sensor grooves 56a, 56b having rectangular cross-sections and sensor dog grooves or bolt grooves 58a, 58b having cross-shaped cross-sections of the kind shown in FIG. 4 are respectively formed in the inner walls of both sides of the support frame 24. As shown in FIG. 2, these are mutually parallel in the X axis direction and are formed along the entire length of the support frame 24. The bolt grooves 58a, 58b are grooves for receiving a nut part of a bolt and in this embodiment, as shown in FIG. 4, a long plate-shaped sensor dog 64 is attached by a bolt 62 having a sensor dog fixing member, such as a nut 60, received in the bolt groove 58a to the left all of the support frame 24 so as to close off part of the sensor groove 56a. This sensor dog 64 is movable along the bolt groove 58a in the X axis direction by loosening the bolt 60.

On the other hand, in the thrust mechanism 36 of the first slider 14, an optical position detecting sensor 66 is mounted at a height facing the sensor groove 56a on the support frame 24 side. This position detecting sensor 66 detects the distance to the facing surface and in this embodiment the position of the first slider 14 with respect to an origin position is recognized from an output signal of this position detecting sensor 66. That is, the output signal of the position detecting sensor 66 changes between a position where the sensor dog 64 is mounted and a position where it is not mounted, and by mounting the sensor dog 64 with its end in a position constituting the origin position of the first slider 14 whether or not the first slider 14 is in the origin position is recognized based on the output signal of the position detecting sensor 66. Recognition of the position of the first slider 14 is carried out by a control device not shown in the drawings to which the output signal of the position detecting sensor 66 is fed.

Also, in this embodiment, a stopper groove 65 having a cross-shaped cross-section like the bolt grooves 58a, 58b is also formed along the whole length of the support frame 24 in a taper part 24b positioned on the inner side of the support frame 24. As shown in FIG. 3, a mechanical stopper 68 as a projection is attached to this stopper groove 65 by a stopper fixing member, such as a nut 69. This mechanical stopper 68 limits the movement of the first slider 14 in the X axis direction by abutting with the guide part 44, and as shown in FIG. 3 is mounted at both ends of the range over which the first slider 14 can move. This mechanical stopper 68 also, like the sensor dog 64, is movable along the stopper groove 65 in the X axis direction by loosening the nut 69, and by changing the position in which it is mounted it is possible to change the range over which the first slider 14 can move.

The first slider support part 12 of this embodiment has a left-right symmetrical shape in FIG. 4. Although a detailed description will be omitted, the second slider support part 16 also has a similar construction to the first slider support part 12. For example, it has a screw shaft mechanism similar to the screw shaft 30 and the ball screw nut 40 and a frame structure similar to the support frame 24. That is, the second slider 18 is moved in the Y axis direction with respect to the second slider support part 16 by a ball screw mechanism wherein a nut rotates with respect to a fixed screw shaft. Also, a hollow part, air suction holes, sensor grooves and bolt grooves etc are formed in the support frame of the second slider support part 16 as in the support frame 24.

Next, the operation of the embodiment thus constructed will be described.

In the first slider support part 12, during driving, that is, when the first slider 14 is being moved reciprocally by the motor proper 46, the hollow parts 52b, 52d of the support frame 24 are air-sucked by the pump 55. As a result of this air suction, at the contacting parts of the guide part 44 of the first slider 14 and the guide rail 28, produced dust and the like is sucked into the hollow parts 52b, 52d through the air suction holes 54. Similarly, in the second slider support part 16 also, localized suction of produced dust and the like is carried out at the guide rail part of the second slider 18 through air suction holes formed in the support frame. As a result, produced dust and the like does not get outside through the window W and impairment of the cleanliness factor is prevented.

As described above, in this embodiment, because localized suction of the insides of the first slider support part 12 and the second slider support part 16 is carried out using the hollow parts formed in the support frame 24, compared to a case wherein pipes are disposed as conventionally, the first slider support part 12 and the second slider support part 16 and so on can be made small. That is, it is possible to make the apparatus small. Also, because a small pump is sufficient compared to conventional technology wherein the whole of the inside of the apparatus has been sucked, the apparatus does not become large and the manufacturing cost also can be kept low.

Furthermore, because suction is carried out at a position very near the guide rail 28 which is a dust production location, dust and the like is effectively sucked and it is possible to realize a high anti-dust effect. Also, because there are no pipes, the structure is simple and maintainability is also good.

In this embodiment, because the positions of the sensor dog 64 and the mechanical stopper 68 etc can be changed in the directions of movement of the first slider 14 and the second slider 18 etc, it is possible to change the origin positions and the ranges of movement of the first slider 14 and the second slider 18 according to the conditions of use of the robot 10.

Also, in this embodiment, because the first slider support part 12 and the second slider support part 16 have left-right symmetrical structures, the first slider 14 and the second slider 18 can have left-right symmetrical structures and still be mountable.

In the embodiment described above, a nut-rotating type ball screw was used to move the first slider 14 and the second slider 18; however, an ordinary ball screw wherein the screw shaft rotates and the nut side is fixed may alternatively be used. In this case, because dust production at bearing parts supporting the screw shaft becomes a problem, air suction holes connecting to the hollow part of the frame may also be provided near the bearings and air suction can also carried out at the bearing parts.

According to a robot of this invention, it is possible to effectively prevent the production of dust without the robot becoming large or expensive.

What is claimed is:

1. An orthogonal coordinate type robot comprising:
   a slider;
   a support frame supporting the slider for movement within a predetermined range along an axis, the support frame having an inner wall surface, at least one hollow portion, and a connecting hole for communicating the hollow portion with the inner wall surface; and
   suction means for evacuating air by suction from the hollow portion of the support frame.

2. An orthogonal coordinate type robot according to claim 1; further comprising a guiding member mounted on the support frame for guiding the slider along the axis, the guiding member being disposed proximate an opening of the connecting hole of the support frame at the inner wall surface thereof.

3. An orthogonal coordinate type robot according to claim 1; wherein the support frame comprises a base portion having both the hollow portion and the connecting hole formed therein.

4. An orthogonal coordinate type robot according to claim 3; further comprising a guiding member mounted on the support frame for guiding the slider along the axis, the guiding member being disposed over the base portion of the support frame and proximate an opening of the connecting hole.

5. An orthogonal coordinate type robot according to claim 1; further comprising limiting means for limiting the range of movement of the slider along the axis.

6. An orthogonal coordinate type robot according to claim 5; wherein the limiting means comprises a groove formed in the inner wall surface of the support frame, and a stopper element integrally connected to the groove and positioned in the range of movement of the slider.

7. An orthogonal coordinate type robot according to claim 1; further comprising a first groove formed in the inner wall surface of the support frame along the direction of movement of the slider, a sensor dog adjustably positionable along the first groove, and a detecting sensor mounted on the slider for detecting the sensor dog during movement of the slider.

8. An orthogonal coordinate type robot according to claim 7; further comprising a second groove formed in the inner wall surface of the support frame in parallel relation to the first groove, the sensor dog covering a portion of the second groove.

9. An orthogonal coordinate type robot according to claim 1; further comprising a guide rail mounted on the support frame and a guide member integrally connected to the slider, the guide member being mounted on the guide rail for movement along the axis and defining contacting portions of the guide rail and the guide member; and wherein the suction means includes means for evacuating air surrounding the contacting portions of the guide rail and the guide member through the connecting hole and the hollow portion of the support frame.

10. An orthogonal coordinate type robot comprising:
    a support frame having an inner wall surface, a plurality of hollow portions, and a plurality of connection holes each for communicating one of the hollow portions with the inner wall surface;
    a slider mounted on the support frame for movement along an axis;
    guiding means disposed between the slider and the support frame for guiding the slider along the axis; and
    suction means for evacuating air surrounding the guiding means through the connecting holes and the hollow portions of the support frame.

11. An orthogonal coordinate type robot according to claim 10; wherein the guide means comprises a guide rail mounted on the support frame and a guide member integrally connected to the slider, the guide member being mounted to the guide rails for movement along the axis and defining contacting portions of the guide rail and the guide member; and wherein the suction means evacuates the air surrounding the contacting portions of the guide rail and the guide member through the connecting holes and the hollow portions of the support frame.

12. An orthogonal coordinate type robot according to claim 11; wherein the contacting portions of the guide rail and the guide members are disposed proximate an opening of each of the connecting holes.

13. An orthogonal coordinate type robot according to claim 10; further comprising limiting means for limiting the range of movement of the slider along the axis of the support frame.

14. An orthogonal coordinate type robot according to claim 13; wherein the limiting means comprises a groove formed in the inner wall surface of the support frame, and a stopper element integrally connected to the groove and positioned in the range of movement of the slider.

15. An orthogonal coordinate type robot according to claim 10; further comprising a first groove formed in the inner wall surface of the support frame along the direction of movement of the slider, a sensor dog adjustably positionable along the first groove, and a detecting sensor mounted on the slider for detecting the sensor dog during movement of the slider.

16. An orthogonal coordinate type robot according to claim 15; further comprising a second groove formed in the inner wall surface of the support frame in parallel relation to the first groove, the sensor dog covering a portion of the second groove.

17. An orthogonal coordinate type robot having a plurality of sliders which move in two mutually orthogonal directions, the orthogonal coordinate type robot comprising:
 a frame;
 a slider mounted on the frame for movement within a predetermined range along an axis of the frame;
 a hollow part provided inside of the frame;
 a connecting hole communicating the hollow part with an inner side space of the frame;
 sucking means for sucking the hollow part;
 a sensor groove formed in an inner wall of the frame along the direction of movement of the slider;
 a sensor dog groove formed in the inner wall of the frame in parallel with the sensor groove;
 a sensor dog fixing member mounted in any position in the sensor dog groove;
 a sensor dog fixed to the inner wall of the frame by the sensor dog fixing member in a position where it covers part of the sensor groove; and
 a position detecting sensor mounted on the slider in a position where it faces the sensor groove for detecting the presence and absence of the sensor dog.

18. An orthogonal coordinate type robot having a plurality of sliders which move in two mutually orthogonal directions, the orthogonal coordinate type robot comprising:
 a frame;
 a slider mounted on the frame for movement within a predetermined range along an axis of the frame;
 a hollow part provided inside of the frame;
 a connecting hole communicating the hollow part with an inner side space of the frame;
 sucking means for sucking the hollow part;
 a stopper groove formed in an inner wall of the frame along the direction of movement of the slider;
 a stopper fixing member mounted in any position in the stopper groove; and
 a stopper member fixed to the stopper groove by the stopper fixing member inside of the movement range of the slider.

* * * * *